(12) United States Patent
Rayala

(10) Patent No.: US 7,574,468 B1
(45) Date of Patent: Aug. 11, 2009

(54) DIGITAL SIGNAL PROCESSOR HAVING INVERSE DISCRETE COSINE TRANSFORM ENGINE FOR VIDEO DECODING AND PARTITIONED DISTRIBUTED ARITHMETIC MULTIPLY/ACCUMULATE UNIT THEREFOR

(75) Inventor: Jitendra Rayala, San Jose, CA (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 881 days.

(21) Appl. No.: 11/083,575

(22) Filed: Mar. 18, 2005

(51) Int. Cl.
*G06F 17/14* (2006.01)
(52) U.S. Cl. .................................... 708/402
(58) Field of Classification Search ................. 708/402
See application file for complete search history.

(56) References Cited

U.S. PATENT DOCUMENTS

| | | | | |
|---|---|---|---|---|
| 5,226,002 A * | 7/1993 | Wu et al. | .................... | 708/607 |
| 6,112,219 A * | 8/2000 | Girod et al. | ................. | 708/402 |
| 6,327,602 B1 * | 12/2001 | Kim | .......................... | 708/401 |
| 6,574,648 B1 * | 6/2003 | Oohashi et al. | ............ | 708/402 |
| 2005/0050128 A1 * | 3/2005 | Ju | ............................. | 708/402 |

OTHER PUBLICATIONS

Katayama, et al. "A Single-chip MPEG1 Audio/Video Decoder Using Macrocore and Cell-base Implementation" IEEE; 1995; pp. 431-440.
Parhi "VLSI Digital Signal Processing Systems" A Wiley-Interscience Publication; 1999; 6 pg.
Masaki, et al. "VLSI Implementation of Inverse Discrete Cosine Transformer and Motion Compensator for MPEG2 HDTV Video Decoding" IEEE Transactions on Circuits and Sytems for Video Technology, vol. 5, No. 5; Oct. 1995; pp. 387-395.
Uramoto, et al. "A 100-MHz 2-D Discrete Cosine Transform Core Processor" IEE Journal of Solid-State Circuits; vol. 27, No. 4; Apr. 1992; pp. 492-499.
White "Applications of Distributed Arithmetic to Digital Signal Processing: A Tutorial Review" IEEE ASSP Magazine; Jul. 1999; pp. 4-19.

* cited by examiner

*Primary Examiner*—David H Malzahn

(57) ABSTRACT

A distributed arithmetic multiply/accumulate (MAC) unit for computing inverse discrete cosine transformations (IDCTs). In one embodiment, the distributed arithmetic MAC unit includes: (1) a first pipeline stage configured to perform dot products on received sequential input data and (2) a second pipeline stage coupled to the first pipeline stage and configured to compute additions and subtractions of the dot products to yield sequential output data.

16 Claims, 10 Drawing Sheets

DIGITAL SIGNAL PROCESSOR HAVING INVERSE DISCRETE COSINE TRANSFORM ENGINE FOR VIDEO DECODING AND PARTITIONED DISTRIBUTED ARITHMETIC MULTIPLY/ACCUMULATE UNIT THEREFOR

CROSS-REFERENCE TO RELATED APPLICATION

The present application is related to U.S. patent application Ser. No. 11/083,646, filed concurrently herewith by Rayala, entitled "Digital Signal Processor having Inverse Discrete Cosine Transform Engine for Video Decoding and Partitioned Distributed Arithmetic Multiply/Accumulate Unit Therefor," commonly assigned with the present invention and incorporated herein by reference in its entirety.

TECHNICAL FIELD OF THE INVENTION

The present invention is directed, in general, to digital signal processors and, more specifically, to a digital signal processor having an inverse discrete cosine transformation (IDCT) IDCT engine for video decoding and a partitioned distributed arithmetic multiply/accumulate (MAC) unit for such IDCT engine.

BACKGROUND OF THE INVENTION

Two-dimensional (2D) discrete cosine transformation (DCT) operations are commonly used in Motion Picture Experts Group (MPEG) video encoding to decorrelate the image samples which allows compression of the input data. DCT is a close approximation of the optimal Karhunen-Loeve transform for a wide class of images. In the IDCT engine, an inverse discrete cosine transformation (IDCT) is used to recorrelate the image samples. In MPEG encoding or decoding, a 2D 8×8 IDCT is normally used.

Since IDCT is an orthogonal transformation, the 2D transform can be computed by first performing one-dimensional (1D) transformations on the eight rows and then performing 1D transformations on the columns of the result from the row stage. Those skilled in the art usually refer to this process as "row-column decomposition." Various fast algorithms have been developed for computing the 1D IDCT, but are outside the scope of the present discussion.

To perform MPEG decoding, a software implementation of the IDCT has been developed for the ZSP500 Digital Signal Processor (see, ZSP500 *Digital Signal Processor Technical Reference Manual*, LSI Logic Corp., Milpitas, Calif., USA, 2003, incorporated herein by reference in its entirety). To take advantage of the architectural features of the ZSP500 processor, an Even-Odd decomposition IDCT algorithm (see, e.g., Hung, et al., "A Compact IDCT design for MPEG Video Decoding," in Proceedings 1997 IEEE Workshop on Signal Processing Systems (SiPS 1997), November 1997) incorporated herein by reference in its entirety. This algorithm has uniform butterfly structure that makes it amenable for implementing on processors such as ZSP500. Unfortunately, software implementations are computationally burdensome, reducing the speed at which a DSP can perform IDCT and reducing processor bandwidth perhaps useful for purposes.

Accordingly, what is needed in the art is a hardware-based IDCT circuit. More specifically, what is needed in the art is a hardware-based IDCT circuit that is fast and efficient and can be used as a co-processor for a DSP, for example.

SUMMARY OF THE INVENTION

To address the above-discussed deficiencies of the prior art, the present invention provides, in one aspect, a distributed arithmetic multiply/accumulate (MAC) unit for computing IDCTs. In one embodiment, the distributed arithmetic MAC unit includes: (1) a first pipeline stage configured to perform dot products on received sequential input data and (2) a second pipeline stage coupled to the first pipeline stage and configured to compute additions and subtractions of the dot products to yield sequential output data.

In another aspect, the present invention provides a DSP. In one embodiment, the DSP includes: (1) a core containing a pipeline control unit having a co-processor interface and (2) a co-processor coupled to the core and containing an distributed arithmetic multiply/accumulate (MAC) unit for computing inverse discrete cosine transformations, including: (2a) a first pipeline stage configured to perform dot products based on sequential input data received from the co-processor interface and (2b) a second pipeline stage coupled to the first pipeline stage and configured to compute additions and subtractions of the dot products to yield sequential output data for transmission toward the co-processor interface.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Before describing an embodiment of an IDCT engine constructed in accordance with the broad principles of the present invention, some preferred design goals will first be outlined. More specifically, the illustrated embodiment of the IDCT engine has two broad design goals. First, the IDCT engine should be able to support multiple frame sizes and frame rates in MPEG-2 and MPEG-4 standards. These include the frame rates and sizes of the MPEG-2 profiles from MP@LL to MP@HL and MPEG-4 profiles from SP@L3 to Main@L4. The profiles MP@HL and Main@L4 specify the maximum digital High Definition Television (HDTV) frame size and rate requirements. These are given in Table 1, below.

TABLE 1

Specifications of Different MPEG-2 and MPEG-4 Profiles

| Profile | Resolution (pixels) | Frame Rate | Color Format |
|---|---|---|---|
| MP@LL | 720 × 576 | 60 | 4:2:2 |
| MP@HL | 1920 × 1088 | 30 | 4:2:2 |
| Main@L4 | 1920 × 1088 | 30 | 4:2:2 |

The IDCT engine can certainly support other profiles with lower performance requirements. To support the above profiles, the IDCT engine has to perform 8×8 2D IDCTs with frame sizes and rates shown in Table 1. The number of IDCTs that need to be calculated at these frame sizes and rates in one second is shown in Table 2, below. Assuming that one 2D 8×8 IDCT can be computed in 100 clock cycles, the clock at which the IDCT engine has to be run is also shown in Table 2.

TABLE 2

Processing Complexity of IDCT

| Profile | Number of IDCTs | Clock Rate (MHz) |
|---|---|---|
| MP@LL | 777600 | 77.76 |
| MP@HL | 1958400 | 195.84 |
| Main@L4 | 1958400 | 195.84 |

Figure 1:
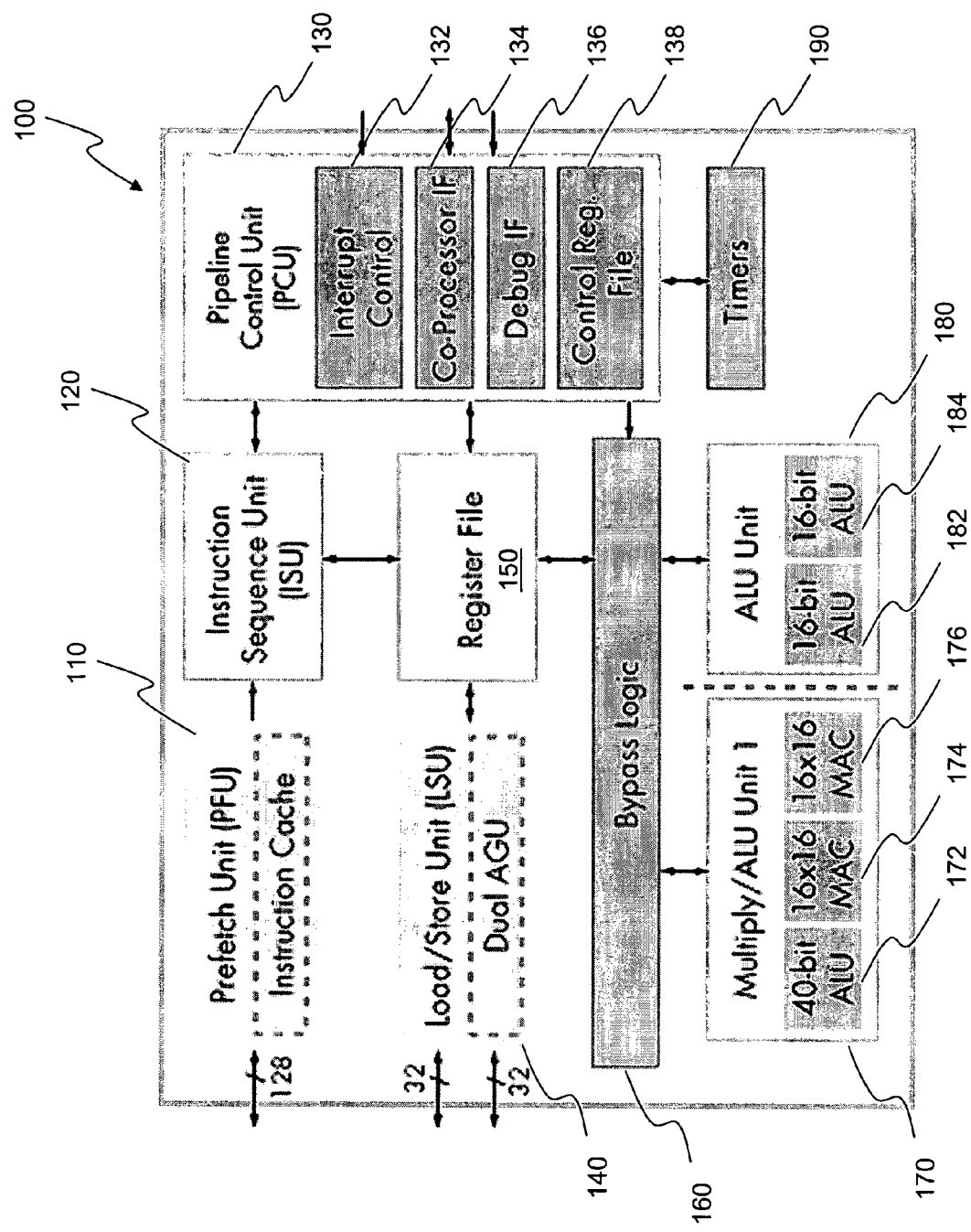
FIG. 1 illustrates a block diagram of a DSP capable of accommodating an IDCT engine constructed according to the principles of the present invention either as part of its core or as a co-processor adjunct thereto.

Second, the IDCT engine should, in some embodiments, be employable as a co-processor to the ZSP programmable DSP core (see, *ZSP500 Digital Signal Processor Technical Reference Manual*, supra, incorporated herein by reference in its entirety. Accordingly, as an example, FIG. 1 illustrates a block diagram of a DSP core 100 capable of accommodating an IDCT engine constructed according to the principles of the present invention either as part of the DSP core 100 or as a co-processor adjunct thereto.

The exemplary embodiment of the DSP core 100 is a ZSP-500, commercially available from LSI Logic of Cupertino, Calif. The DSP core 100 includes a prefetch unit (PFU) 110 configured to prefetch instructions from memory (not shown) and store them temporarily in an instruction cache (shown but not separately referenced). An instruction sequence unit (ISU) 120 is coupled to the PFU and is configured to retrieve instructions from the instruction cache of the PFU 110 in proper order for efficient and orderly execution.

A pipeline control unit (PCU) 130 is coupled to the ISU 120 and is configured to control the execution of the instructions as ordered by the ISU 120. Accordingly, the PCU 130 is illustrated as including an interrupt control 132, a co-processor interface 134, a debug interface 136 (advantageously a Joint Test Action Group, or JTAG, interface) and a control register file 138 that contains control registers. A register file 150 is coupled to the ISU 120 and the PCU 130 and contains operands upon which the instructions work.

A load/store unit (LSU) 140 is coupled to the register file 150 and is configured to load (retrieve) operands from memory and store (write back) operands to memory. Bypass logic 160 is coupled to the register file 150 and the PCU 130 and is configured to route operands to various processing resources in a multiply/arithmetic logic unit (MAC/ALU) 170 and an ALU unit 180. The MAC/ALU 170 includes a 40-bit ALU 172 and first and second 16×16 MACs 174, 176. The ALU unit 180 includes first and second 16-bit ALUs 182, 184.

When used as a co-processor, the IDCT engine (not shown in FIG. 1, but coupled to the DSP core 100 via the co-processor interface 134) has to be clocked as fast as the DSP clock in order to avoid stalling of the DSP's pipeline. Since the DSP in question is the ZSP-500, the IDCT engine should be able to run at clock speeds around 200 MHz. Having described the architecture of an exemplary DSP, the architecture and implementation of an IDCT engine that can satisfy the above requirements can now be discussed.

The input to the exemplary IDCT engine has 12-bit precision. During decoding, the internal precision of the IDCT algorithm affects the quality of the reconstructed image. Therefore, to ensure that the encoded stream gets decoded with minimal degradation, it is preferable that the implementation of the IDCT algorithm in the IDCT engine hold bit errors in the reconstructed output to within certain tolerable levels. These are specified as part of the IEEE 1180 specification (see, *IEEE Standard Specifications for the Implementation of 8×8 Inverse Discrete Cosine Transform, IEEE* 1180-1990 (*R*1997), IEEE, 1990, incorporated herein by reference in its entirety). The MPEG-2 and MPEG-4 standards specify a few more tests in addition to those IEEE 1180 sets. Any MPEG-2 and MPEG-4 IDCT implementations must also to satisfy these requirements.

An 8-point, one-dimensional IDCT is defined as:

$$x_n = \sum_{m=0}^{7} X_m \alpha_m, n = 0, 1, \ldots 7 \qquad (1)$$

where $X_m$ are the IDCT inputs and $x_n$ are the pixels from the inverse transformation. The coefficients $\alpha_m$ are defined as:

$$\alpha_m = \begin{cases} \frac{1}{\sqrt{2}} \cos\left[\frac{(2m+1)\pi}{16}\right] & m = 0 \\ \cos\left[\frac{(2m+1)\pi}{16}\right] & m = 1, \ldots 7 \end{cases} \qquad (2)$$

Using matrix symmetry properties, the 1D IDCT can be decomposed in to even and odd parts known as "even-odd decomposition." Even-odd decomposition can be represented in matrix-vector form as two matrices:

$$\begin{bmatrix} r_0 \\ r_1 \\ r_2 \\ r_3 \end{bmatrix} = \begin{bmatrix} c_4 & c_4 & c_2 & c_6 \\ c_4 & -c_4 & c_6 & -c_2 \\ c_4 & -c_4 & -c_6 & c_2 \\ c_4 & c_4 & -c_2 & -c_6 \end{bmatrix} \begin{bmatrix} X_0 \\ X_4 \\ X_2 \\ X_6 \end{bmatrix}, \quad (3)$$

$$\begin{bmatrix} s_0 \\ s_1 \\ s_2 \\ s_3 \end{bmatrix} = \begin{bmatrix} c_7 & -c_5 & c_3 & -c_1 \\ c_5 & -c_1 & c_7 & c_3 \\ c_3 & -c_7 & -c_1 & -c_5 \\ c_1 & c_3 & c_5 & c_7 \end{bmatrix} \begin{bmatrix} X_1 \\ X_3 \\ X_5 \\ X_7 \end{bmatrix}$$

where the coefficients $c_k$ are defined as:

$$c_k = \frac{1}{\sqrt{2}} \cos\left[\frac{k\pi}{16}\right] \quad k = 1, \ldots 7 \quad (4)$$

Then the IDCT output can be obtained from the above as two matrices:

$$\begin{bmatrix} x_0 \\ x_1 \\ x_2 \\ x_3 \end{bmatrix} = \begin{bmatrix} r_0 + s_3 \\ r_1 + s_2 \\ r_2 + s_1 \\ r_3 + s_0 \end{bmatrix}, \quad \begin{bmatrix} x_4 \\ x_5 \\ x_6 \\ x_7 \end{bmatrix} = \begin{bmatrix} r_3 - s_0 \\ r_2 - s_1 \\ r_1 - s_2 \\ r_0 - s_3 \end{bmatrix} \quad (5)$$

Figure 2:
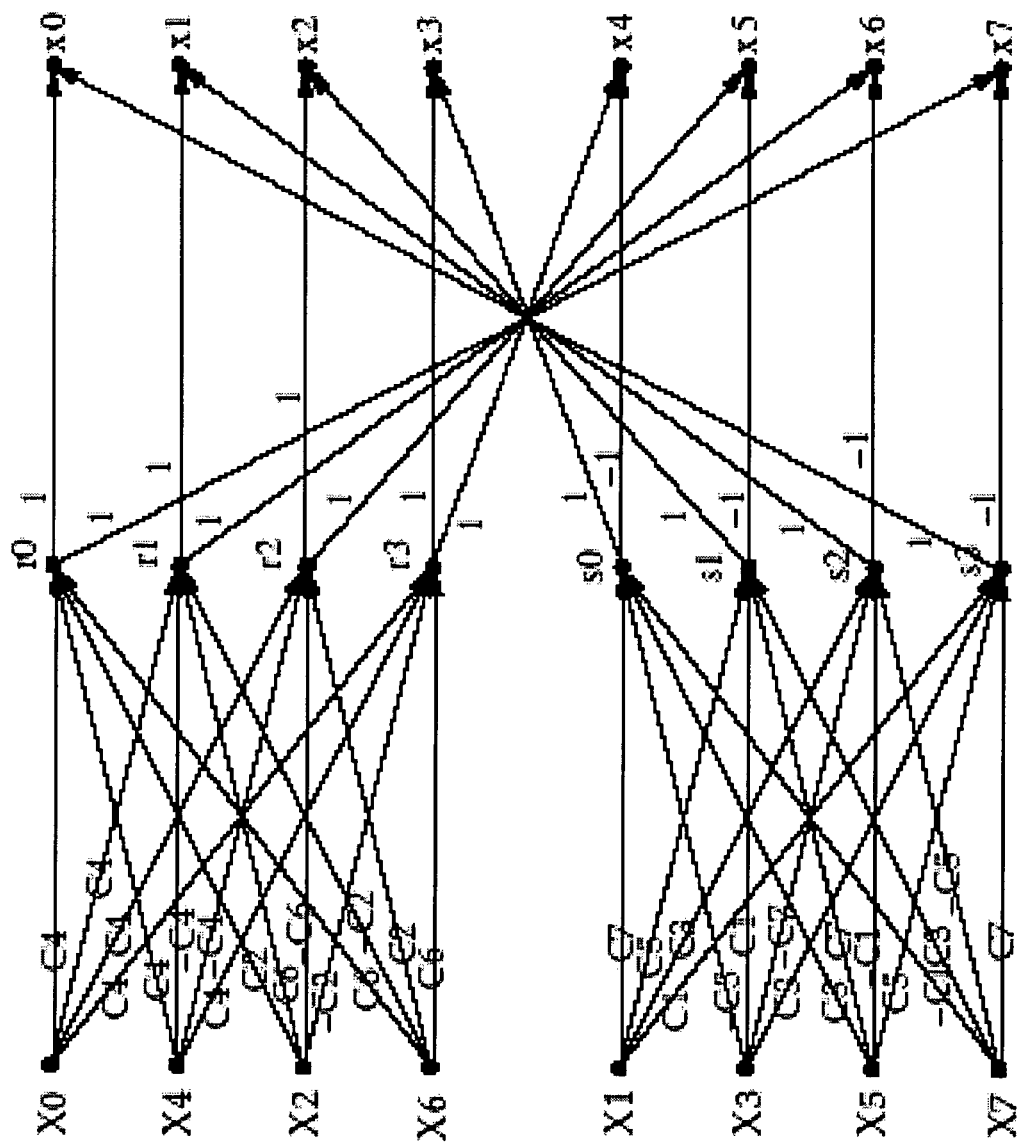
FIG. 2 illustrates an exemplary signal flow graph corresponding to an even-odd decomposition 1D IDCT algorithm.

Turning now to FIG. 2, illustrated is a signal flow graph corresponding to the above operations of the even-odd decomposition 1D IDCT algorithm.

As mentioned above, a 2D IDCT can be performed in two stages. First, a 1D IDCT of the rows is computed. Then, a 1D IDCT is computed on the columns of the intermediate result. Using this technique, a computation of 2D IDCT can be pipelined into two stages. In the first stage, eight 1D IDCTs are performed along the rows are performed, and the intermediate results are stored. Then, using the same 1D IDCT engine, the next eight 1D IDCTs are performed on the columns of the intermediate results.

The IDCT engine may be used with different video system architectures. For example, the IDCT engine may be used as a loosely-coupled co-processor (LCC) to ZSP second-generation DSPs or as a memory-mapped co-processor (MMC) to ZSP first-generation DSPs (as these DSPs do not have a co-processor interface). When used as a co-processor, the input to the IDCT engine may come from the DSP. Alternatively, if the co-processor interface bandwidth is not sufficient, a dedicated memory interface may be used to get the input directly from the DSP's memory. In both cases, a straightforward controller will manage the data and the operation of the IDCT engine, allowing the IDCT engine to be adapted to a particular application.

In view of the above, the IDCT engine has been designed to perform only one stage (row or column) of the 2D IDCT at a time. The IDCT engine reads data sequentially, performs either the row or the column transformation and provides the results sequentially. When enabled, the IDCT engine computes eight 1D IDCTs in a pipelined fashion.

As mentioned above, an external controller may need to be designed depending on the application. The controller advantageously provides the data to the IDCT engine sequentially and manages the IDCT engine's input/output and temporary buffers. In the first stage (processing of rows), the controller advantageously reads the data either from the ZSP processor or from a dedicated memory interface and stores the intermediate results in the temporary buffer. In the second stage (processing of columns), the controller advantageously reads data from the temporary buffer and sends the final results to either a ZSP processor or to the dedicated memory interface.

Two primary stages of computation are evident from Equations (3) and (5), above, and the signal flow diagram of the IDCT algorithm in FIG. 2. The first stage involves computing eight dot products of vectors of length four. The second stage involves computing the addition and subtraction of the results of the dot product and then extracting the appropriate bits from the result of addition and subtraction.

Consider the first row of the first matrix of Equation (3):

$$r_0 = X_0 c_4 + X_4 c_4 + X_2 c_2 + X_6 c_6 \quad (6)$$

Equation (6) is a sum-of-product of the elements of two vectors of length four. Similarly, the other rows in the first matrix of Equation (3) can also be described in the same way. The computation of the values $r_0 \ldots r_3$ and $s_0 \ldots s_3$ involves multiply-accumulate operations. If these eight values are computed by eight independent arithmetic units, the multiplier and the adder structures needed for implementing the multiply-accumulate operation determine the area and speed of these units.

However, recall that in the two matrices of Equation (3), the coefficients $c_1 \ldots c_7$ are constants. Since $c_1 \ldots c_7$ are constants, full multipliers are not needed in implementing the multiply-accumulate units. Stanley A. White, in "Applications of Distributed Arithmetic to Digital Signal Processing: A Tutorial Review," IEEE ASSP Magazine, pp. 4-19, July 1989 (incorporated herein by reference), presents one of the ways to implement such multiply-accumulate operations efficiently when the coefficients are constants.

Since the coefficient values are known a priori, the multiply-accumulate operations can be distributed in look-up table (LUT) operations and additions/subtractions (see, e.g., White, supra). Consider the computation of dot product of two vectors of length K:

$$y = \sum_{k=0}^{K-1} X_k c_k \quad (7)$$

where y is the result of the dot product, $X_k$ are two's complement N+1-bit input samples and $c_k$ are the M-bit fixed coefficients. Since the inputs $X_k$ to the IDCT algorithm are signed integer values, they can be expressed as:

$$X_k = -2^N b_{kN} + \sum_{n=0}^{N-1} b_{kn} 2^n \quad (8)$$

where $b_{kn}$ are either 0 or 1, and $b_{kN}$ is the sign bit. Substituting Equation (8) in Equation (7) yields:

$$y = -2^N \left[\sum_{k=0}^{K-1} c_k b_{kN}\right] + \sum_{n=0}^{N-1} \left[\sum_{k=0}^{K-1} c_k b_{kn}\right] 2^n \quad (9)$$

Equation (9) represents the basic distributed arithmetic operation. Note that the above formulation is slightly different from the one in White (supra) where the inputs are assumed to be fractions with the property that $|X_k|<1$. Since the bits $b_{kn}$ take only values 0 and 1 and the values $c_n$ are fixed coefficients, the term in the brackets of Equation (9) can only take 2K values. Therefore, these can be precomputed and stored as one or more ROM LUTs. The bits $b_{kn}$ can be extracted from the input data and used as index in to these LUTs. The values read can then be accumulated in accordance with Equation (9). Various techniques may be employed to reduce the LUT sizes. White, supra, and Parhi, VLSI Digital Signal Processing Systems Design and Implementation, New York, John Wiley, 1999, incorporated herein by reference, provide more details on how distributed arithmetic can be implemented and various schemes to reduce the LUT sizes.

In the present IDCT case, the values for K, N and M are 4, 15 and 12 respectively. Equation (9) operates on one bit at a time. Accordingly, computing the dot product of K=4 length vectors, given a 16-bit input, requires 16 clock cycles. The number of clock cycles required can be reduced by operating on multiple bits every clock cycle. White and Parhi, supra, describe a scheme that uses consecutive bits in the input samples and accumulates multiple LUT results into a single multi-input accumulator. For example, if four input bits are operated upon at a time, four LUT results have to be accumulated into a multi-input accumulator. Uramoto, et al., "A 100-MHz 2-D Discrete Cosine Transform Core Processor," IEEE Journal of Solid State Circuits, vol. 27, no. 4, pp. 491-499, April 1992 (incorporated herein by reference) discloses a scheme operating on two bits at a time. However, Uramoto, et al.'s scheme is limited to operating on only two bits at a time. More than two bits should be operated upon at a time to reduce latency.

Katayama, et al., "A Single Chip MPEG1 audio/video decoder using macrocore and cell based implementation," IEEE VLSI Signal Processing, VIII (Osaka, Japan), pp. 431-440, October 1995 (incorporated herein by reference) discloses a scheme operating on three bits at a time and uses multiple multi-input adders. Masaki, et al., "VLSI Implementation of Inverse Discrete Cosine Transformer and Motion Compensator for MPEG2 HDTV Video Decoding," IEEE Transactions on Circuits and Systems for Video Technology, vol. 5, pp. 387-395, 1995 (incorporated herein by reference) discloses a scheme that operates on four bits and uses a Wallace-Tree implemented with a multi-input accumulator. Unfortunately, the critical path in both of these schemes is through the multi-input accumulator after the LUT operation. Since the IDCT engine of the present invention advantageously operates at high clock rates, a more efficient pipelining of the distributed arithmetic operation is much desired.

To pipeline more efficiently, one embodiment of the present invention calls for the distributed arithmetic algorithm to be partitioned into two stages. In the first stage, the distributed arithmetic algorithm is partitioned into parallel and smaller distributed arithmetic operations. In the second stage, the results from the first stage are added to get the final results. This partitioning ensures that the critical path involves only the delay of a two-input adder (not that of a multi-input adder as in other schemes) after the table look-up operation just like the original DA algorithm. This enables achieving very high operating clock speeds and lower silicon area. Also, if more than four bits need to be processed at a time in order to reduce the latency more, only the partitioning of the DA algorithm as described herein allows it. The schemes based on multi-input accumulators do not scale well when more than four bits need to be processed as the number of inputs to the accumulator increases. As the number of inputs to the accumulator increases, achieving higher clock speeds and lower silicon area becomes much more difficult. The resulting algorithm, which will hereinafter be referred to as the partitioned distributed arithmetic (PDA) algorithm, and a concomitant arithmetic MAC architecture will now be discussed. The PDA algorithm enables very efficient pipelining.

The value of each of the terms in the brackets depends only on the index n. Therefore, Equation (9) can be represented as:

$$y = -2^N F(c, N) + \sum_{n=0}^{N-1} F(c, n) 2^n \qquad (10)$$

where F(c,n) is defined as:

$$F(c, n) = \sum_{k=0}^{K-1} c_k b_{kn} \qquad (11)$$

The functions F(c,n) represent a LUT operation in which a group of $n^{th}$ bits of the input values are used as index into a LUT. Since, in the case of IDCT engine, the value of N is 15, Equation (10) can be written as:

$y=2^0[F(c,0)+2^1F(c,1)+2^2F(c,2)+2^3F(c,3)]$ $2^4[F(c,4)+2^1F(c,5)+2^2F(c,6)+2^3F(c,7)]$ $2^8[F(c,8)+2^1F(c,9)+2^2F(c,10)+2^3F(c,11)]$ $2^{12}[F(c,12)+2^1F(c,13)+2^2F(c,14)+2^3F(c,15)] \qquad (12)$ The terms in the brackets in Equation (11) can be accumulated independent of each other to generate partial sums which can then be accumulated again to get the final result. Rewriting Equation (12) yields:

$y=2^0 Q_0+2^4 Q_1+2^8 Q_2+2^{12} Q_3 \qquad (13)$ where the partial sums $Q_0$, $Q_1$, $Q_2$ and $Q_3$ are defined as:

$Q_0=F(c,0)+2^1F(c,1)+2^2F(c,2)+2^3F(c,3)$ $Q_1=F(c,4)+2^1F(c,5)+2^2F(c,6)+2^3F(c,7)$ $Q_2=F(c,8)+2^1F(c,9)+2^2F(c,10)+2^3F(c,11)$ $Q_3=F(c,12)+2^1F(c,13)+2^2F(c,14)+2^3F(c,15) \qquad (14)$ From Equations (13) and (14), it can be seen that the distributed arithmetic operation has been partitioned into two stages. The first stage corresponds to the independent accumulations defined in the Equation (14). The second stage then is the final accumulation defined in Equation (13).

In Equation (14), the distributed arithmetic operation has been partitioned into four independent accumulations, so four input bits are operated upon at a time. Since in the present IDCT case, the number of bits in the input samples is (N+1) =16, the four independent accumulations in Equation (14) can be completed in four clock cycles.

Equation (13) involves four additions which can be completed in four clock cycles by using a single adder. Therefore, the two stages of the PDA can be block pipelined so that after every four clock cycles, the second stage operation can be performed on the results from the first stage. As stated above, eight values (namely $r_0 \ldots r_3$ and $s_0 \ldots s_3$) need to be computed in the first stage of the IDCT algorithm. Since the computation of these values involves similar operations, the architecture of an exemplary PDA MAC unit for computing $r_0$ in these two pipeline stages will now be discussed.

To compute the sum-of-products using distributed arithmetic, all the eight IDCT values are needed before the computation can be started. Also, since the sum-of-products stage of the 1D IDCT has been partitioned into two stages, it can be seen that there are four main stages in the computation of IDCT. Using this property, an efficient architecture using a pipelining scheme at the block and clock cycle level is developed.

Figure 3:
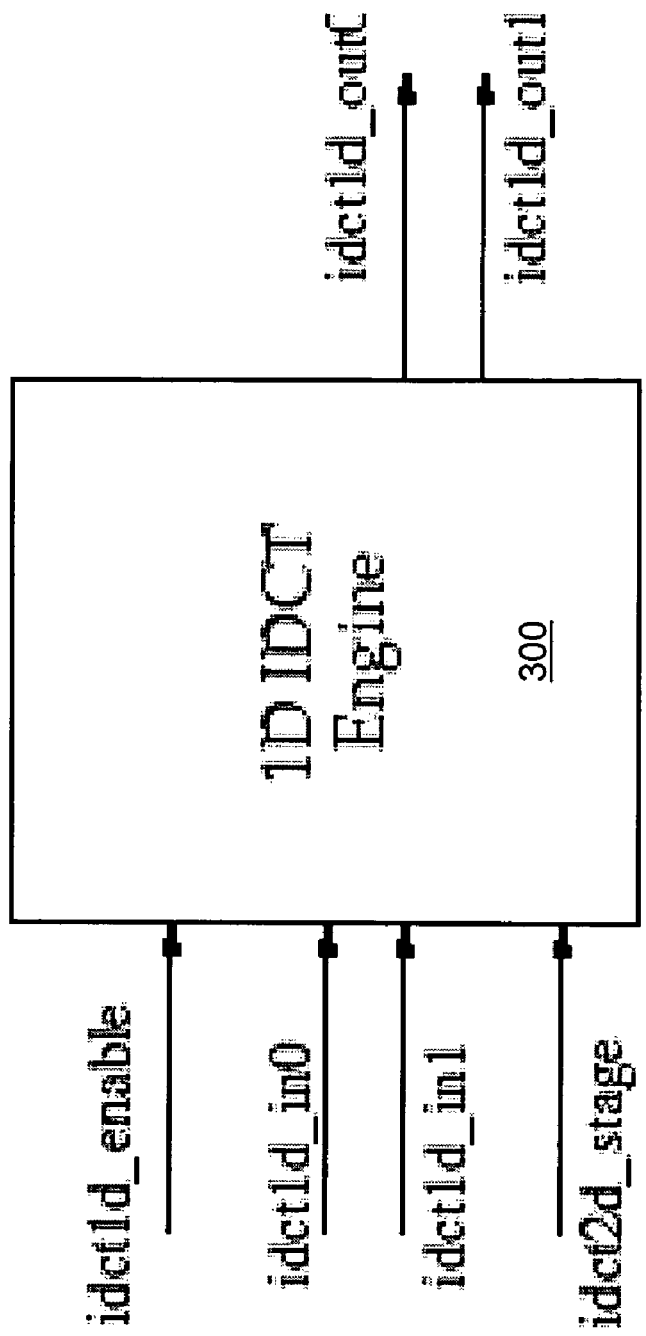
FIG. 3 illustrates a top-level block diagram of one embodiment of an IDCT engine constructed according to the principles of the present invention.

Turning now to FIG. 3, illustrated is a top-level block diagram of an IDCT engine 300 constructed according to the principles of the present invention. Hereafter, the IDCT engine 300 will be referred to as a "1D IDCT" IDCT engine to indicate that the IDCT engine essentially computes eight 1D IDCTs in a pipelined fashion.

The 1D IDCT engine 300 has four input and two output ports. An input signal idct1*d*_enable is a control signal that enables or disables the IDCT engine. After the IDCT engine 300 is enabled, from next clock cycle onwards, the IDCT engine 300 accepts two 16-bit IDCT samples every clock cycle represented by the input signals idct1*d*_in0 and idct1*d*_in1. Since eight 1D IDCTs contain 64 data samples, the data samples can be fed to the IDCT engine 300 in 32 clock cycles. The signal idct2*d*_stage informs the IDCT engine 300 which stage of the 2D IDCT is being performed. The signal idct2*d*_stage is used (a) in selecting an appropriate rounding factor that is needed to make the IDCT engine 300 IEEE 1180-compliant and (b) to select appropriate bits for the output.

The IDCT engine 300 has two 16-bit outputs, namely idct1*d*_out0 and idct1*d*_out1, and can sustain two outputs per clock cycle after a fixed latency from the time the IDCT engine 300 is enabled. One stage of a 2D IDCT can potentially be performed in 46 clock cycles. As a result, a 2D IDCT can potentially be completed in around 92 clock cycles.

Figure 4:
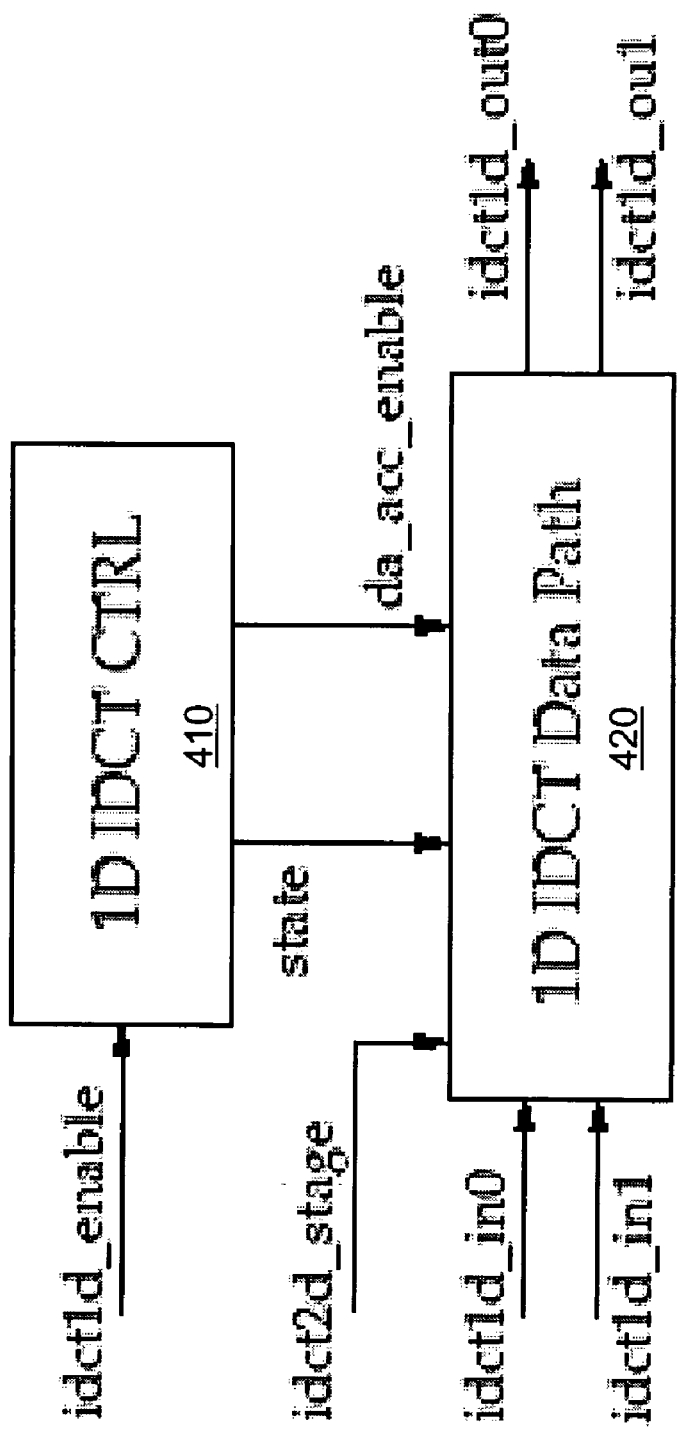
FIG. 4 illustrates a more detailed block diagram of one embodiment of the IDCT engine of FIG. 3.

Turning now to FIG. 4, illustrated is a more detailed block diagram of the IDCT engine 300 of FIG. 3. A module 1D IDCT CTRL 410 serves as a control unit that employs a straightforward state machine and logic (described below with reference to FIG. 10) to enable and disable the PDA MAC units. A module 1D IDCT DPATH 420 serves as the data path unit of the IDCT engine where the various stages of the pipeline are performed.

As stated above, the PDA-based 1D IDCT algorithm primarily has four stages of operation. By pipelining these four stages at a block level, the IDCT engine can be made to operate on multiple 1D IDCTs sequentially. The idea of block pipelining will now be shown. Accordingly, turning now to FIG. 5, illustrated is a four-stage pipeline that forms the module 1D IDCT DPATH 420 (the data path unit) of FIG. 4.

Figure 5:
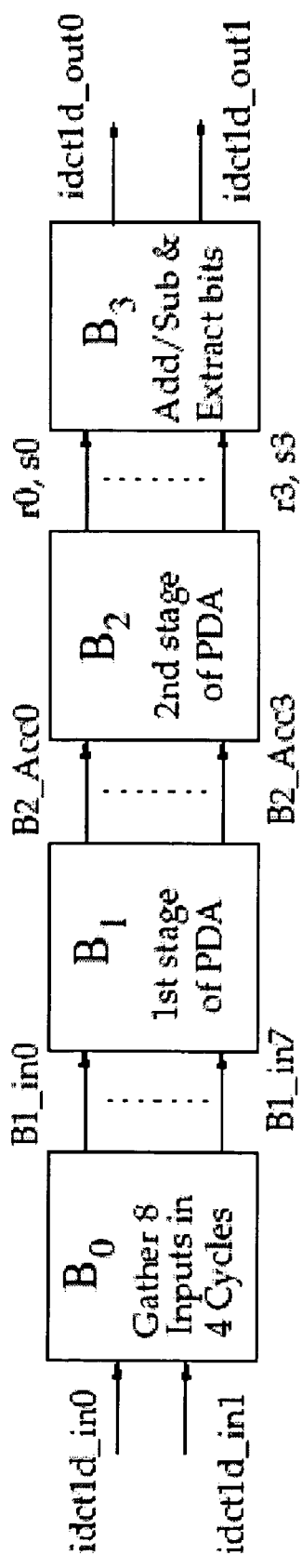
FIG. 5 illustrates a block diagram of one embodiment of a four-stage pipeline that forms the module 1D IDCT DPATH of FIG. 4.

It is apparent from FIG. 5 that the four stages of the algorithm are performed in four pipeline stages $B_0$, $B_1$, $B_2$ and $B_3$. The operations are pipelined every four clock cycles. At the end of every four clock cycles, new input is fed to the next pipeline stage and new input is accepted from the previous pipeline stage. In the pipeline stage $B_0$, eight 1D IDCT input samples are gathered in four clock cycles. The first and second stages of the PDA are performed in the pipeline stages $B_1$ and $B_2$, respectively. The operations of addition or subtraction of the results of the PDA MAC units, extraction of the appropriate bits and then driving the output of the IDCT engine are performed in pipeline stage $B_3$.

Pipeline Stage $B_0$

Since, from FIG. 2, the IDCT engine can accept two input samples every clock cycle, eight samples can be gathered in four clock cycles. Accordingly, after the IDCT engine is enabled, eight input samples are gathered in the pipeline stage $B_0$ every four clock cycles. These eight samples are then forwarded to the pipeline stage $B_1$ to be processed in the first stage of the PDA.

Since the first stage of the PDA needs all the eight inputs for the next four clock cycles, these samples need to be preserved when the next eight samples are being gathered in $B_0$ pipeline stage. This can be done by capturing the inputs into a simple register file in the pipeline stage $B_0$ and then transferring to another register file at the end of every four clock cycles. The first stage of PDA in the pipeline stage $B_1$ then uses the second register file as input.

Pipeline Stage $B_1$

In the pipeline stage $B_1$, the first stage of the PDA is performed. Consider the partial sum $Q_0$ in Equation (6). It involves four look-up table operations and a shifting and accumulation of the results. Since the precision of the coefficients is 12 bits, the functions $F(c,n)$ defined in the matrices of Equation (3) need 14 bits to represent the maximum value. In Equation (6), since the look-up table values are shifted by a maximum shift of four, the final result of the partial sums can be represented by 18 bits. As a result, 20-bit adders may be advantageously employed to implement the first stage of the PDA algorithm. An exemplary architecture of the pipeline stage $B_1$ will now be described with reference to FIG. 6.

Four identical sub-units 610, 620, 630, 640 correspond to the four partial sums in Equation (6). The input signals B1_in0, B1_in2, B1_in4 and B1_in6 represent the input samples gathered in the pipeline stage $B_0$. The registers B2_Acc0 ... B2_Acc3 hold the partial sums $Q_0$ ... $Q_3$ in Equation (6).

Figure 6:
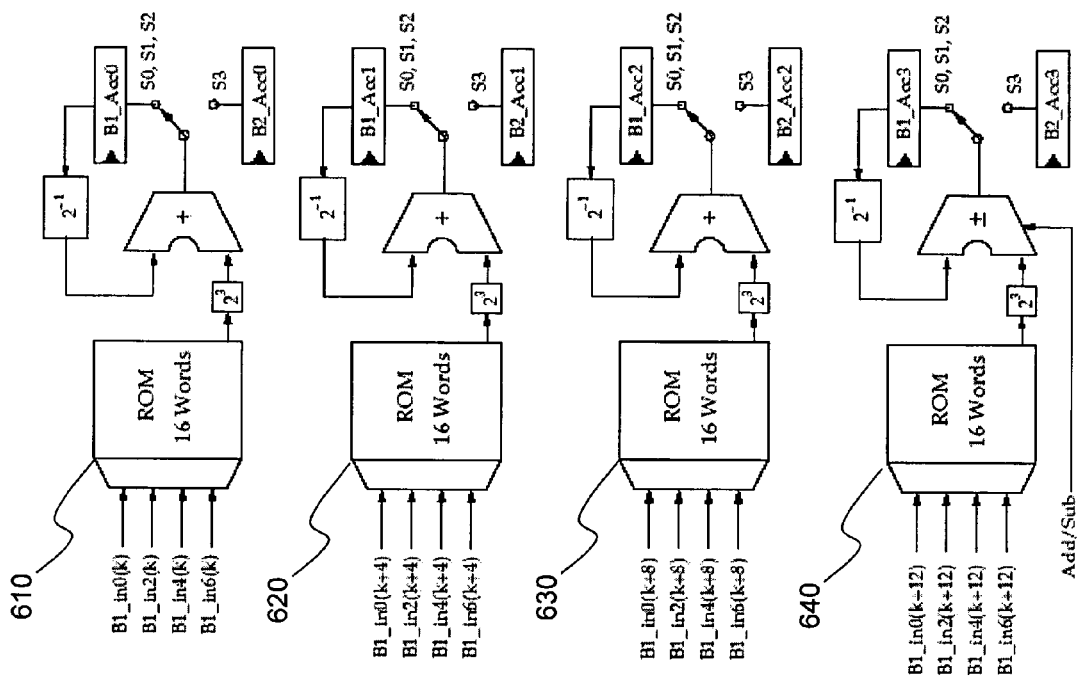
FIG. 6 illustrates a block diagram of one embodiment of the pipeline stage $B_1$ of FIG. 5.

As can be seen in FIG. 6, four groups of four bits are extracted and are provided as inputs to the sub-units 610, 620, 630, 640. The first sub-unit 610 operates on bits 0, 1, 2 and 3 in successive clock cycles. Similarly the second sub-unit 620 operates on bits 4, 5, 6 and 7, the third sub-unit 630 operates on bits 8, 9, 10 and 11 and finally the last sub-unit 640 operates on bits 12, 13, 14 and 15. They are used as input to look-up tables, which may advantageously be contained in read-only memory (ROM).

If the shift and accumulation of the table look-up is implemented as defined in Equation (6), a costly barrel shifter would be needed. However, to avoid the barrel shifter, the shift-accumulation may be advantageously performed by shifting the table look-up output value by a fixed amount to the left and then shifting the accumulator right to obtain an operation equivalent to a barrel shifter.

Since the second stage $B_2$ of the PDA needs to keep the accumulated values from the first stage $B_1$ until it completes the final result, two separate registers are used as accumulators. In the first three clock cycles represented by the states $S_0$, $S_1$ and $S_2$, the values are accumulated into an internal accumulator. For example, in the first sub-unit 610, the internal accumulator is represented by a register B1_Acc0. In the fourth clock cycle represented by the state $S_3$, the internal accumulator is cleared for the next accumulation, and the final result is routed to a second register B2_Acc0 which acts as input to the $B_2$ pipeline stage.

The path defined by the LUT operation, followed by the accumulation into the register is the critical path in the illustrated embodiment of the IDCT engine, since it determines the speed at which the IDCT engine can be clocked.

Pipeline Stage $B_2$

Figure 7:
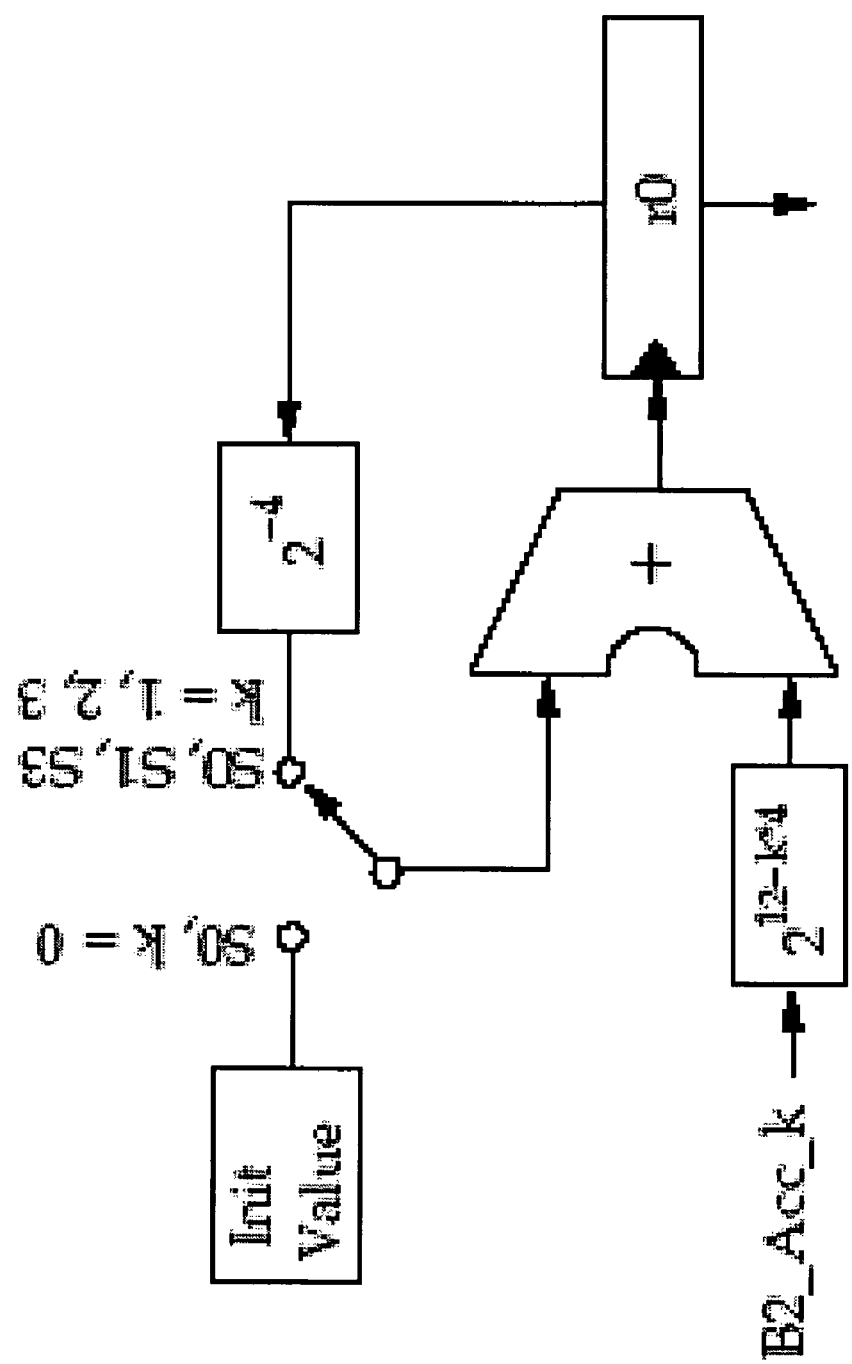
FIG. 7 illustrates a block diagram of one embodiment of the pipeline stage $B_2$ of FIG. 5.

In pipeline stage $B_2$, the second stage of the PDA is performed; partial sums are accumulated to yield the final result $r_0$ as defined in Equation (5). At the end of every four clock cycles, four registered outputs represented by accumulators B2_Acc0, B2_Acc1, B2_Acc2 and B2_Acc3 from pipeline stage $B_1$ are available. These are to be accumulated over four clock cycles in pipeline stage $B_2$. This can implemented by the architecture shown in FIG. 7. Since the accumulators B2_Acc0, B2_Acc1, B2_Acc2 and B2_Acc3 are 20-bit registers and are shifted by a maximum shift value of 12 as defined in Equation (5), a 32-bit register is used as the final accumulator, and the addition operation is performed by a 32-bit adder. Here too, to avoid a costly barrel shifter, a shift-accumulation may be performed as discussed earlier.

In the first clock cycle corresponding to the state S0, the accumulator is initialized by the result from the addition of the B2_Acc0 accumulator shifted by 12 with the initialization value as shown in FIG. 3. Only the values in the accumulators $r_0 \ldots r_3$ need to be initialized with a rounding factor. The accumulators $s_0 \ldots s_3$ do not need to be added with the rounding factor because it gets propagated automatically to all the output values after the addition/subtraction butterfly operation in the pipeline stage $B_3$ (to be described below).

In the second, third and fourth clock cycles corresponding to the states $S_1$, $S_2$ and $S_3$, the accumulator is shifted right by four and the shifted values from the first stage of PDA are accumulated to the register. At the end of four clock cycles, the new value of the accumulator is available for the next pipeline stage $B_3$ for performing the addition/subtraction butterfly operation. Since the accumulators $r_0 \ldots r_3$ and $s_0 \ldots s_3$ are initialized at the end of the first clock cycle, they need to be preserved in the pipeline stage $B_3$. This is done by copying all of the accumulator values to another register file so that they remain available during the pipeline stage $B_3$.

The amount of rounding required to be performed on the final results from the addition/subtraction butterfly operation in the pipeline stage $B_3$ determines the initialization value. The value of rounding itself is decided based on (a) whether row or column stage is being processed and (b) where the most significant bits of the output are present in the 32-bit accumulator.

In the row processing stage of the IDCT engine, the input and the constant coefficients are of 12-bit precision. Taking into consideration the maximum possible bit growth, bits 9 to 24 are the most significant 16-bits of the output. It is advantageous to add a half bit to the final result to achieve the desired rounding. Therefore, since the least significant bit starts at bit 9, the rounding value is 28=256.

In the column stage of the IDCT, the input is of 16-bit and the constant coefficients are of 12-bit precision. Taking into consideration, the maximum possible bit growth, bits 16 to 31 are the most significant 16-bit outputs. Here also, a half bit should be added to the final result to achieve the desired rounding. Therefore, since the least significant bit starts at bit 16, the rounding value is 215=16384.

Pipeline Stage $B_3$

Figure 8:
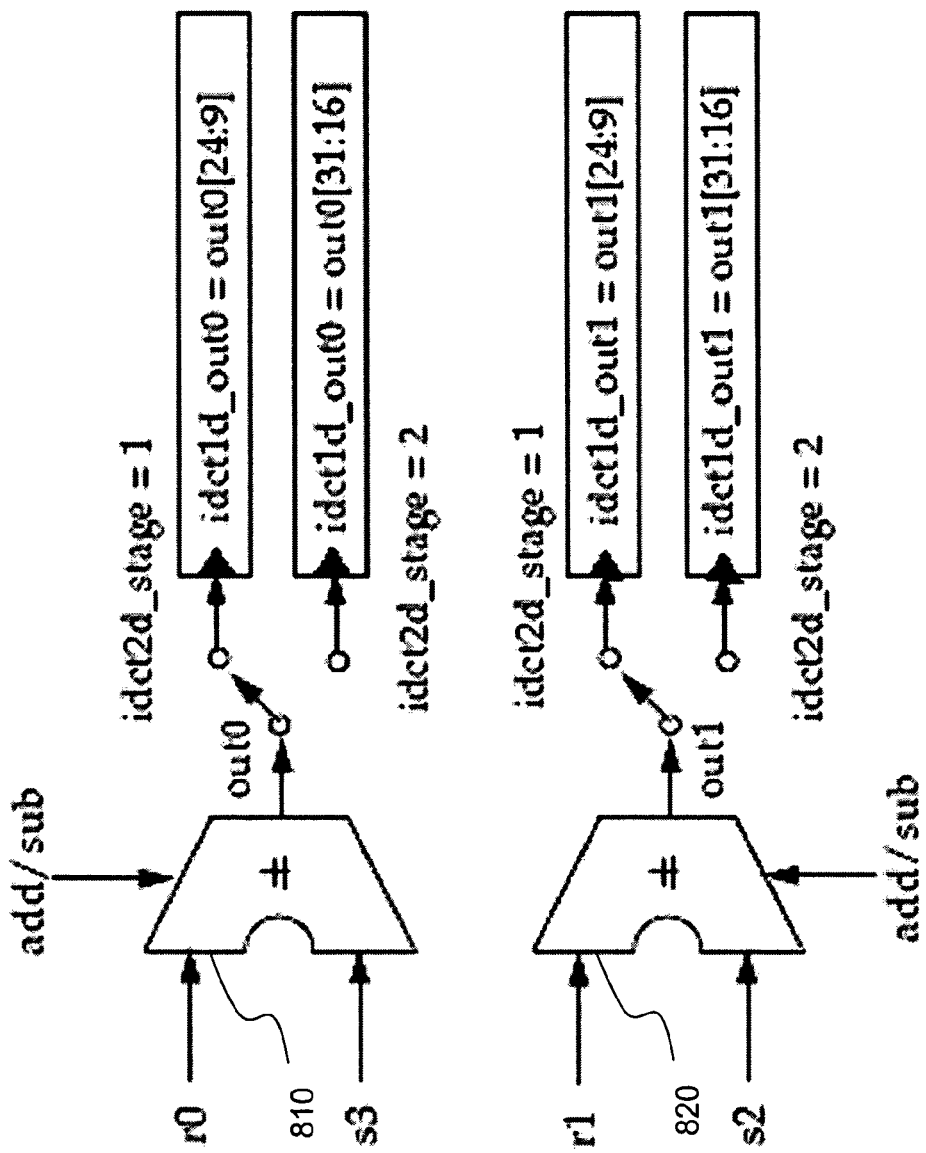
FIG. 8 illustrates a block diagram of one embodiment of the pipeline stage $B_3$ of FIG. 5.

In the pipeline stage $B_3$, three operations are performed. First, the outputs from the PDA MAC units are added or subtracted as shown in the Equation (5) and per the signal flow graph of FIG. 2. Next, appropriate bits are extracted from that output. The extracted bits are then registered to drive the output of the IDCT engine. FIG. 8 shows these operations.

The architecture of the $B_3$ pipeline stage is built around two 32-bit adder/subtractors 810, 820. In every clock cycle, either two additions or subtractions are performed. Appropriate inputs to the adder/subtractors 810, 820 are routed depending which of the IDCT outputs are being. FIG. 8 shows the inputs for computing the first two IDCT output values. Computing the first four IDCT output values involves additions, and the last four output values involves subtractions as shown in Equations (5) and per the signal flow graph of FIG. 2.

Depending on whether the row or column IDCTs are being performed, appropriate bits are extracted from the outputs of the adder/subtractors 810, 820 of FIG. 8. The extracted bits are then registered to drive the output of the IDCT engine. All the eight IDCT outputs can be computed using these two adder/subtractors 810, 820 in four clock cycles.

Figure 9:
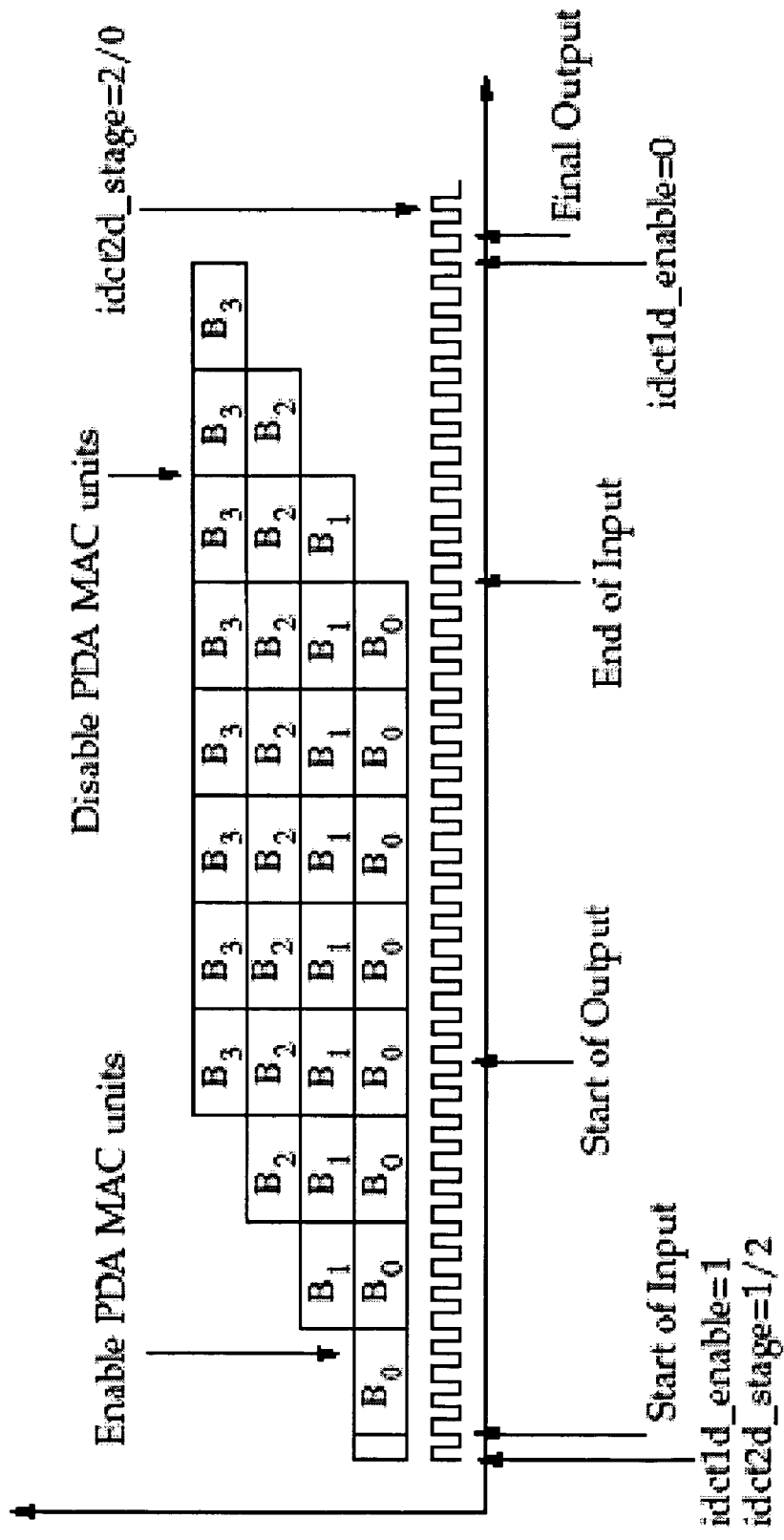
FIG. 9 illustrates an exemplary clock cycle-by-clock cycle progression of the computation and the concept of block pipelining as carried out according to the principles of the present invention.

Turning now to FIG. 9, illustrated is an exemplary clock cycle-by-clock cycle progression of the computation and the concept of block pipelining. More specifically, FIG. 9 shows the sequence of operations of one stage of the 2D IDCT. The operations in the IDCT engine begin with IDCT processing.

From the second clock cycle onwards, the IDCT engine accepts two 16-bit input samples every clock cycle for the next 32 clock cycles. Therefore, the pipeline stage $B_0$ is active during this time. At the beginning of the fifth clock cycle, the PDA MAC units are enabled to begin the processing of the pipeline stage $B_1$ of the PDA. At the end of the fifth clock cycle, the eight IDCT inputs are transferred to the pipeline stage $B_1$. At that time, the pipeline stage $B_1$ becomes active and stays active for the next 32 clock cycles.

At the end of the ninth clock cycle, the pipeline stage $B_2$ of the PDA becomes active and stays active for the next 32 clock cycles. After 13 clock cycles, the pipeline stage $B_3$ becomes active and stays active for the next 32 clock cycles. The first pair of outputs appear at the end of the $15^{th}$ clock cycle. Then the IDCT engine continues to accept input and sustain the output every clock cycle. At the end of the $33^{rd}$ clock cycle and assuming no further IDCT work to be done, the pipeline stage $B_0$ becomes inactive as all the 64 inputs samples have been fed to the IDCT engine. After this, the pipeline stages $B_1$, $B_2$ and $B_3$ becomes inactive at the end of $37^{th}$, $41^{st}$ and $45^{th}$ clock cycles, respectively.

At the beginning of the $45^{th}$ clock cycle, the controller may disable the IDCT engine. Also, at the end of $45^{th}$ clock cycle, the last pair of IDCT outputs are available after which the controller may change the idct2d_stage signal. From FIG. 9 it can be seen that one stage (row or column) of the 2D IDCT can potentially be performed in 46 clock cycles. Thus, a 2D IDCT can potentially be completed in 92 clock cycles.

Recall from FIGS. 3 and 4, above, that the IDCT engine 300 of FIG. 3 internally has a module 1D IDCT CTRL 410 that serves as a control unit and a module 1D IDCT DPATH 420 that serves as a data path unit. In the illustrated embodiment of the present invention, all the operations in the four block pipeline stages are implemented in the module 1D IDCT DPATH 420. Since the operations in the IDCT engine 300 are block pipelined every four clock cycles, the module 1D IDCT CTRL 410 may advantageously be embodied in a state machine.

Figure 10:
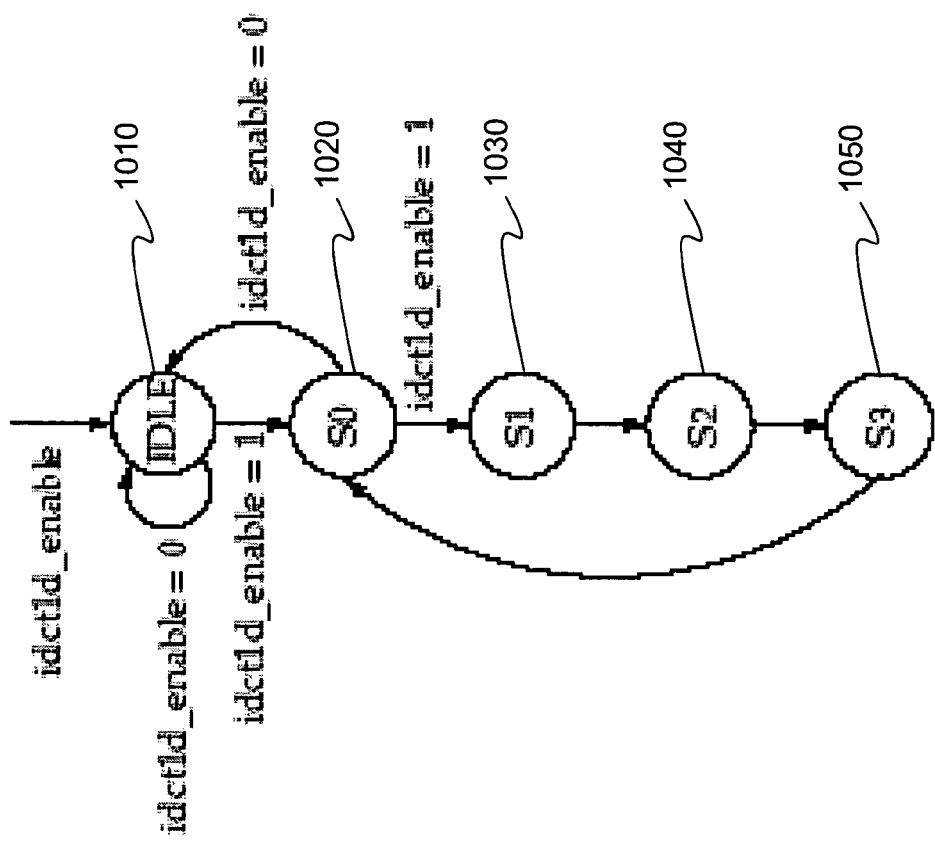
FIG. 10 illustrates an exemplary state machine that may be used to control the exemplary embodiment of the IDCT engine of FIG. 3.

Accordingly, turning now to FIG. 10, illustrated is an exemplary state machine that can be used to control the exemplary embodiment of the IDCT engine 300 of FIG. 3. The state machine contains four states corresponding to the four clock cycles and represented by an $S_0$ state 1020, an $S_1$ state 1030, an $S_2$ state 1040 and an $S_3$ state 1050. The IDCT engine normally resides in an IDLE state 1010. When the idct1d_enable signal is received, the state machine transitions from the IDLE state 1010 to the $S_0$ state 1020 and transitions among in the $S_0$ state 1020, the $S_1$ state 1030, the $S_2$ state 1040 and the $S_3$ state 1050 as long as the idct1d_enable signal is enabled.

From the above, it is apparent that a novel architecture and exemplary implementation details of an IDCT engine for MPEG decoding applications has been introduced. The IDCT engine is based on an efficient algorithm called "even-odd decomposition." The computational and precision requirements and the ways in which the IDCT engine can be used either in a standalone mode or as a co-processor are discussed. To achieve high clock rates and small area, a technique for efficient pipelining according to a distributed arithmetic method is introduced.

Although the present invention has been described in detail, those skilled in the art should understand that they can make various changes, substitutions and alterations herein without departing from the spirit and scope of the invention in its broadest form.

What is claimed is:

1. A distributed arithmetic multiply/accumulate (MAC) unit for computing inverse discrete cosine transformations, comprising:

a first pipeline stage of said distributed arithmetic MAC configured to perform dot products on received sequential input data, wherein row transformations are performed initially and column transformations are performed subsequent to said row transformations; and a second pipeline stage of said distributed arithmetic MAC coupled to said first pipeline stage and configured to compute additions and subtractions of said dot products to yield sequential output data, wherein said distributed arithmetic MAC unit has a 12-bit precision.

2. The distributed arithmetic MAC unit as recited in claim 1 wherein said first pipeline stage comprises at least one look-up table and is configured to perform look-up table operations and a shifting and accumulation to perform said dot products.

3. The distributed arithmetic MAC unit as recited in claim 1 wherein said dot products are vectors of length four.

4. The distributed arithmetic MAC unit as recited in claim 1 wherein appropriate bits of said additions and subtractions are extracted to yield said output data.

5. The distributed arithmetic MAC unit as recited in claim 1 wherein said first pipeline stage is configured to compute eight 1D IDCTs in a pipelined fashion.

6. The distributed arithmetic MAC unit as recited in claim 1 wherein said output data is rounded.

7. The distributed arithmetic MAC unit as recited in claim 1 wherein said first pipeline stage has sub-units configured to operate on four bits of said input data.

8. The distributed arithmetic MAC unit as recited in claim 1 wherein said input data corresponds to a selected one of MPEG-2 profiles from MP@LL to MP@HL and MPEG-4 profiles from SP@L3 to Main@L4.

9. A digital signal processor (DSP), comprising:

a core containing a pipeline control unit having a co-processor interface; and a co-processor coupled to said core and containing an distributed arithmetic multiply/accumulate (MAC) unit for computing inverse discrete cosine transformations, including:

a first pipeline stage of said distributed arithmetic MAC configured to perform dot products based on sequential input data received from said co-processor interface, wherein row transformations are performed initially and column transformations are performed subsequent to said row transformations, and a second pipeline stage of said distributed arithmetic MAC coupled to said first pipeline stage and configured to compute additions and subtractions of said dot products to yield sequential output data for transmission toward said co-processor interface, wherein said distributed arithmetic MAC unit has a 12-bit precision.

10. The distributed arithmetic MAC unit as recited in claim 9 wherein said first pipeline stage comprises at least one look-up table and is configured to perform look-up table operations and a shifting and accumulation to perform said dot products.

11. The distributed arithmetic MAC unit as recited in claim 9 wherein said dot products are vectors of length four.

12. The distributed arithmetic MAC unit as recited in claim 9 wherein appropriate bits of said additions and subtractions are extracted to yield said output data.

13. The distributed arithmetic MAC unit as recited in claim 9 wherein said first pipeline stage is configured to compute eight 1D IDCTs in a pipelined fashion.

14. The distributed arithmetic MAC unit as recited in claim 9 wherein said output data is rounded.

15. The distributed arithmetic MAC unit as recited in claim 9 wherein said first pipeline stage has sub-units configured to operate on four bits of said input data.

16. The distributed arithmetic MAC unit as recited in claim 9 wherein said input data corresponds to a selected one of MPEG-2 profiles from MP@LL to MP@HL and MPEG-4 profiles from SP@L3 to Main@L4.

* * * * *